United States Patent [19]
Tamura

[11] Patent Number: 5,999,215
[45] Date of Patent: *Dec. 7, 1999

[54] IMAGE PICKUP APPARATUS

[75] Inventor: Kyoji Tamura, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,307

[22] Filed: Apr. 24, 1997

Related U.S. Application Data

[63] Continuation of application No. 08/431,628, May 1, 1995, abandoned, which is a continuation of application No. 08/118,152, Sep. 8, 1993, abandoned.

[30] Foreign Application Priority Data

Sep. 14, 1992 [JP] Japan ................................. 4-271174

[51] Int. Cl.[6] ................................................. H04N 5/232
[52] U.S. Cl. ......................................... 348/345; 348/224
[58] Field of Search .................................... 348/223, 224, 348/226, 227, 228, 229, 345, 349, 354, 655; 250/201.8; 352/140; 396/89, 104, 133, 135, 136, 225, 238, 257; H04N 9/73

[56] References Cited

U.S. PATENT DOCUMENTS

| | | | |
|---|---|---|---|
| 4,371,240 | 2/1983 | Shimizu et al. | 352/140 |
| 4,387,975 | 6/1983 | Araki | 354/407 |
| 4,574,303 | 3/1986 | Hashimoto et al. | 348/227 |
| 4,825,293 | 4/1989 | Kobayashi et al. | 348/229 |
| 5,093,716 | 3/1992 | Kondo et al. | 358/41 |
| 5,128,769 | 7/1992 | Arai et al. | 358/228 |
| 5,212,516 | 5/1993 | Yamada et al. | 354/402 |
| 5,319,449 | 6/1994 | Saito et al. | 348/223 |

Primary Examiner—Wendy Garber
Assistant Examiner—Andrew B. Christensen
Attorney, Agent, or Firm—Robin, Blecker & Daley

[57] ABSTRACT

An image pickup apparatus includes an image sensor arranged to photoelectrically convert an image light coming from an object, an iris arranged to adjust the quantity of image light incident on the image sensor, a detection circuit for detecting the state of the iris, a correction circuit to correct the output of the detection circuit so as to correct a change of the iris caused by a change in the mode of shooting, and a focus adjusting device. The correction circuit is arranged such that, when an aperture value is caused to change by a change in the shooting mode, the correction circuit offsets the change of the aperture value by correcting aperture value information before the aperture value information is supplied to the focus adjusting device.

6 Claims, 5 Drawing Sheets

IMAGE PICKUP APPARATUS

This is a continuation application under 37 CFR 1.62 of prior application Ser. No. 08/431,628, filed May 1, 1995, (abandoned) which is a continuation of Ser. No. 08/118,152, filed Sep. 8, 1993 (abandoned).

BACKGROUND OF THE INVENTION

1. Field of the Invention

This invention relates to an image pickup apparatus such as a video camera or the like.

2. Description of the Related Art

In the field of image pickup apparatuses such as video cameras or the like, efforts have been exerted to automate operations and diversify functions in every respect, including an exposure setting action, a focus adjusting action, white balance control, etc. As a result, it has become possible to adequately pick up images irrespective of ambient shooting conditions.

With respect to a focus control device and a white balance correcting device which is arranged in a video camera or the like to control the gain of a color signal according to changes in color temperature of an object of shooting, a method has been contrived to detect the state of an iris mechanism which is used for controlling the quantity of light incident on an image sensor and to perform an optimum control by using the data of detection thus obtained.

Figure 1:
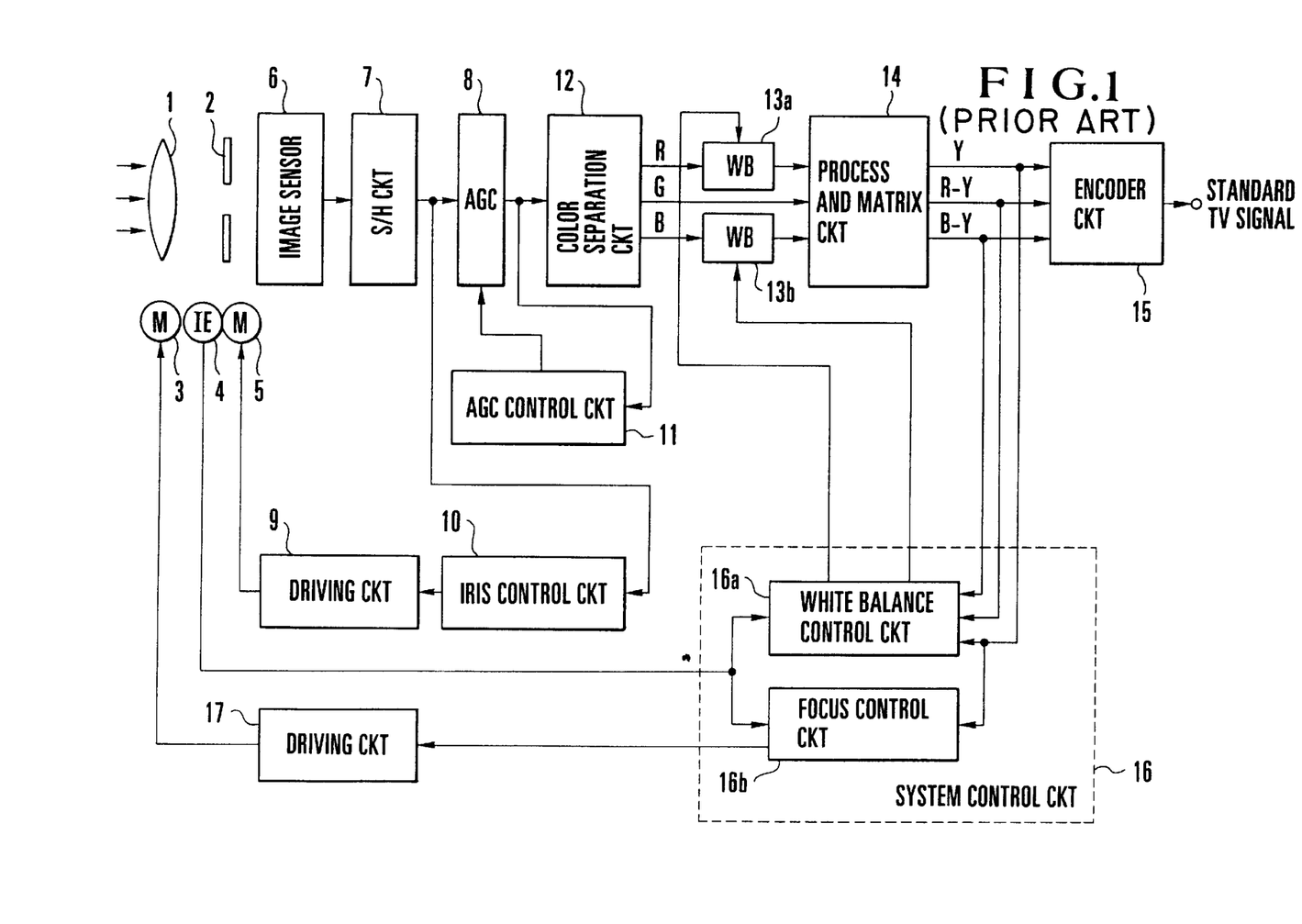
FIG. 1 is a block diagram showing the circuit arrangement of the conventional image pickup apparatus.

The conventional image pickup apparatus has been arranged as shown in FIG. 1. Referring to FIG. 1, an image pickup optical system 1 is arranged to form an image of light coming from an object of shooting. An iris (hereinafter referred to as an iris) 2 is arranged to control the quantity of light coming from the object. A motor 3 is arranged to drive a focus lens included in the image pickup optical system 1. An iris encoder element 4 which is a position encoder and is formed by a Hall element, etc., is arranged to detect the state of the iris 2. A motor 5 is arranged to drive the iris 2. An image sensor 6 which is formed by a CCD, etc., is arranged to photoelectrically convert the light of an image picked up. A sample-and-hold (S/H) circuit 7 is arranged to sample the output (a picked-up image signal) of the image sensor 6. Reference numeral 8 denotes an automatic gain control (AGC) circuit 8. A driving circuit 9 is arranged to drive the iris driving motor 5. An iris control circuit 10 is arranged to control the iris 2 in such a way as to bring the average output level of the image sensor 6 within a predetermined level range. An AGC control circuit 11 is arranged to adjust the gain of the AGC circuit 8 to make the level of the picked-up image signal constant. A color separation circuit 12 is arranged to separate the picked-up image signal into R (red), G (green) and B (blue) color signals. Amplifiers 13a and 13b for white balance control are arranged to amplify the R and B color signals with the respective controllable variable gains. A process and matrix circuit 14 is arranged to form a luminance signal Y and color-difference signals R-Y and B-Y. An encoder circuit 15 is arranged to form a standard TV signal. A system control circuit 16 which is arranged to control the whole image pickup apparatus includes, as main components among others, a white balance control circuit 16a and a focus control circuit (AF device) 16b which is arranged to detect the level, etc., of a high-frequency component of the luminance signal Y and to control the focus lens in such a way as to bring the level of the high-frequency component to a maximum level. A driving circuit 17 is arranged to drive the focus lens driving motor 3.

With the apparatus arranged in the above-stated manner, the quantity of incident light of the object obtained through the image pickup optical system 1 is adjusted by the iris 2. The quantity-adjusted light is photoelectrically converted by the image sensor 6. A video signal outputted from the image sensor 6 is sampled by the sample-and-hold (S/H) circuit 7. The sampled video signal is amplified by the AGC circuit 8 to such a state that enables a next signal processing circuit to adequately carry out a signal processing action on the video signal. The video signal thus amplified is supplied to the color separation circuit 12, which separates the video signal into three primary color signals including R, G and B color signals. Of these color signals, the R and B color signals are supplied via the amplifiers 13a and 13b for white balance control (WB) to the process and matrix circuit 14. The G color signal is supplied directly to the process and matrix circuit 14. The process and matrix circuit 14 then forms the luminance signal Y and the color-difference signals R-Y and B-Y. The luminance signal Y and the color-difference signals R-Y and B-Y are supplied to the encoder circuit 15 to be converted into a video signal which is in the form of a TV signal.

Since the luminance signal Y and the color-difference signals R-Y and B-Y are to be used also for white balance control and focus control, these signals are supplied also to the system control circuit 16. The system control circuit 16 further takes therein the output of the iris encoder element 4 which detects the state of the iris 2. The output of the iris encoder element 4 is used as one of parameters necessary for optimum control over white balance adjustment and focus adjustment. More specifically, the control is based on the following: The depth of field is shallow if the position of the iris 2 is near to its full open position and is deep if it shows a small (stopped-down) aperture. Since the sensitivity of the focus control device for focus adjustment varies with the depth of field, it is necessary to vary its focus lens driving speed and the width of its dead zone according to the depth of field. Therefore, in order that the focus adjustment is stably, smoothly and quickly carried out, it is necessary to have information on the aperture value of the iris which is directly related to the depth of field.

In performing the white balance control, a change or no change in ambient shooting conditions is detected also through a change detected in the aperture value of the iris. According to the detected state of the iris, the control is performed, for example, to restart a white balance adjustment action or to predict the color temperature of a light source illuminating the object as a part of data for finding whether an image is being picked up outdoors or indoors. The aperture value thus gives an important parameter not only for the above-stated control but also for many other control actions of the camera.

However, the image sensor (a CCD in most cases) has recently come to function also as an electronic shutter to permit shooting control in a shutter priority AE mode in which the iris is controlled on the basis of an exposure time arbitrarily selected, or in a mode called "program mode" in which the iris, the AGC circuit and the electronic shutter function are automatically adjusted and controlled on the presumption of some of typical shooting conditions, such as a portrait, a landscape, a sport which shows a quick motion, etc. With these modes employed, the state (position) of the iris might vary with a difference in mode of shooting control even when the shooting object remains unchanged. In such a case, control over the white balance, focus, etc., which uses the information on the state of the iris as one of parameters in computing a correction value comes to be based on a misjudgment. The control thus becomes unstable, thereby degrading the performance of the camera. This problem has made it difficult, for an image pickup apparatus arranged to operate in these shooting control modes, to use an iris state detection signal in controlling the white balance and focus. This problem thus has been an impediment against an improvement in performance of each system related to the above-stated control.

SUMMARY OF THE INVENTION

This invention is directed to the solution of the problem mentioned in the foregoing. It is, therefore, an object of this invention to provide an image pickup apparatus which is arranged to make no erroneous decision in controlling white balance, focus, etc., and thus to permit optimization of related control systems and improvement in their performance.

To attain this object, an image pickup apparatus arranged according to this invention as an embodiment thereof comprises image pickup means for photoelectrically converting an image light coming from an object, an iris arranged to adjust the quantity of image light incident on the image pickup means, detection means for detecting a state of the iris, and correction means arranged to correct an output of the detection means so as to correct a change of the iris caused by a change of mode of shooting.

With the embodiment arranged in this manner, if the value of aperture of the iris happens to vary due to a change from one shooting mode over to another instead of due to a change in the ambient conditions, the aperture value is corrected to prevent erroneous information on the aperture position of the iris from being supplied to focus and white balance controlling devices. The invented arrangement thus effectively eliminates the possibility of having the malfunctions of the control devices when there is no change in the ambient shooting conditions, so that the focus control and the white balance control can be accurately and smoothly carried out by using information on the aperture position of the iris.

The above and other objects and features of this invention will become apparent from the following detailed description of an embodiment thereof taken in connection with the accompanying drawings.

DETAILED DESCRIPTION OF THE PREFERRED EMBODIMENT

Figure 2:
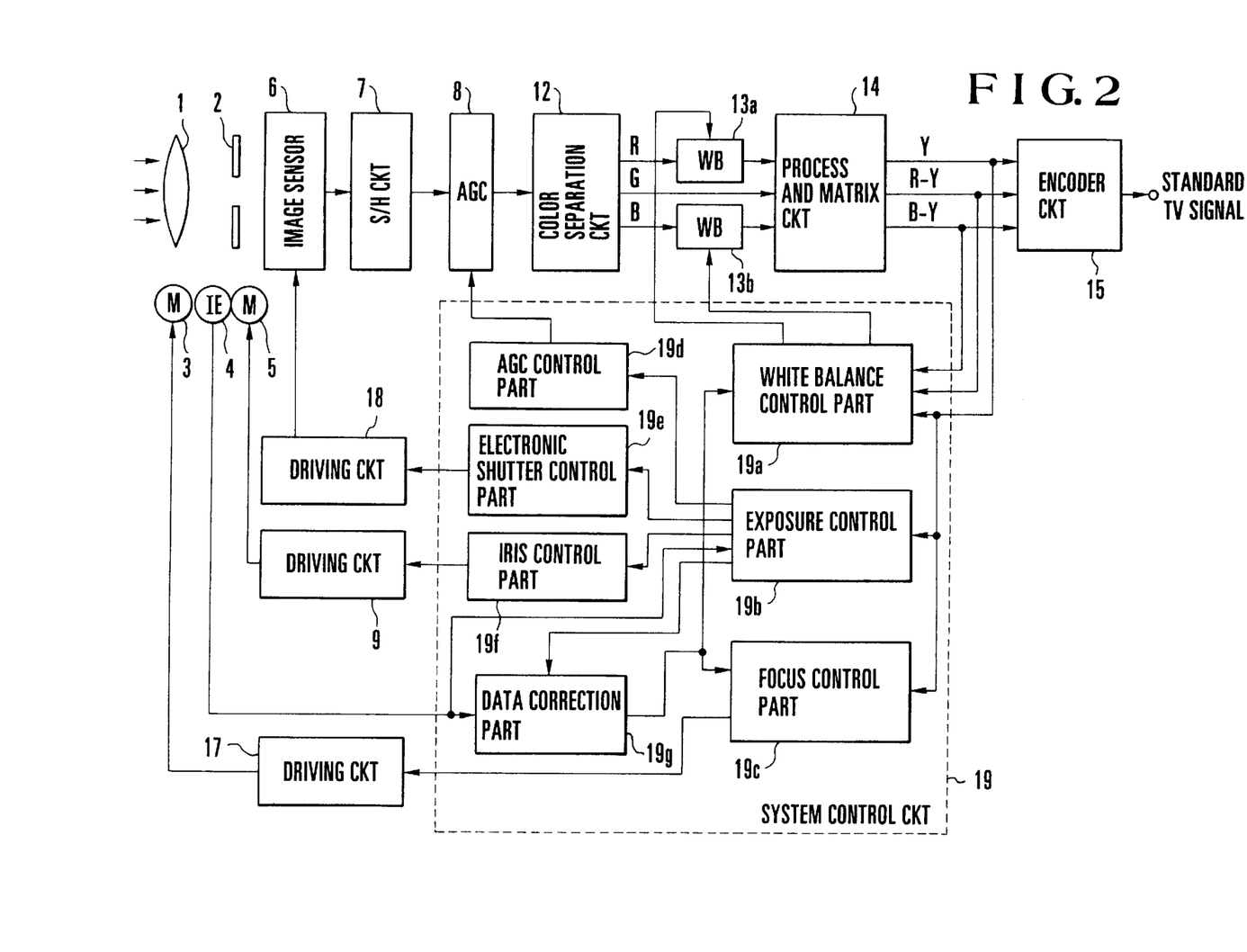
FIG. 2 is a block diagram showing the circuit arrangement of an image pickup apparatus which is arranged according to this invention as an embodiment thereof.

FIG. 2 shows in a block diagram the circuit arrangement of an image pickup apparatus arranged as an embodiment of this invention. In FIG. 2, the same reference numerals as those used in FIG. 1 indicate the same component parts as those of the conventional apparatus. The details of these same parts are omitted from the following description of the embodiment.

Referring to FIG. 2, the quantity of light coming from the object is adjusted by an iris (an iris mechanism) 2 and is photoelectrically converted into a signal by an image sensor 6. The signal is then converted into the form of a TV signal in the same manner as described in the foregoing description of the prior art. A luminance signal Y and color-difference signals R-Y and B-Y formed by a process and matrix circuit 14 are supplied to a white balance control part 19a and a focus control part 19c which are disposed within a system control circuit 19. The white balance control part 19a and the focus control part 19c then compute various correction signals. The correction signals are supplied respectively to amplifiers 13a and 13b which are provided for correction of white balance and a driving circuit 17 which is arranged to drive a focus lens driving motor 3. The inside of the system control circuit 19 is arranged to be capable of controlling a plurality of parameters to be used for exposure control for obtaining beautifully picked up images under various shooting conditions.

More specifically, the system control circuit 19 includes, an automatic exposure (or AE) control part 19b in addition to the white balance control part 19a and the focus control part 19c. The exposure control part 19b is arranged to set various programmed shooting modes for special ambient shooting conditions as well as for ordinary shooting conditions. The system control circuit 19 further includes an AGC control part 19d, an electronic shutter control part 19e and an iris control part 19f. These control parts are arranged to receive information on the luminance level of the object as an input parameter and controls, in accordance with an instruction from the exposure control part 19b, the gain of the signal, the electronic shutter and the iris to give output parameters to be used for exposure control.

The system control circuit 19 further includes a data correction part 19g which is arranged to correct the detection value of an iris encoder element 4 according to an instruction received from the exposure control part 19b and, after that, to supply information on the corrected detection value to the white balance control part 19a and the focus control part 19c. Although the details of it will be described later herein, the data correction circuit 19g is briefly described as follows: In a case where a change is caused in the aperture value by change-over from one program shooting mode to another while the object remains unchanged, the white balance control and the focus control which use the aperture value as a control parameter are prevented from malfunctioning, by correcting and adjusting the aperture value to a value obtained in an ordinary shooting before the change-over and by supplying the corrected aperture value to the white balance control part 19a and the focus control part 19c.

An exposure control performed by controlling the iris, the electronic shutter and the AGC which give exposure control parameters is described as follows:

(i) Iris Control: The quantity of light incident on the image sensor 6 is adjusted by stopping down the aperture of the iris 2. The quantity of light is adjusted according to the electric characteristics of the image pickup apparatus such as its dynamic range, etc. Therefore, while the performance of the image pickup apparatus can be used to a full extent, a diffraction phenomenon which takes place when the iris is stopped down to a small aperture position tends to deteriorate picture quality and the responsivity of the control.

(ii) Electronic Shutter Control: The electronic shutter controls the storage time of electric charge obtained from the picked-up image light at the image sensor. The dynamic resolution of the apparatus can be improved by making the shutter speed faster. Therefore, the electronic shutter control is suited for an object having a quick movement.

(iii) AGC Control: The gain of AGC (automatic gain control) is set to make the signal outputted from the sample-and-hold circuit (S/H) 7 into a state in which the signal can be adequately processed at a signal processing circuit arranged subsequent to the AGC circuit. However, the S/N ratio of the image sensor has recently been improved so much that the noise of an image pickup system does not show up too much even if the rate of amplification is increased by increasing the gain of AGC. Therefore, a range within which the value of gain can be set as a control parameter has substantially increased. Since this parameter belongs to a group of parameters having a quick control response, the AGC control is suited to AE control for a scene requiring a speedy response.

With some typical shooting conditions taken into consideration, control functions are arranged to be used for controlling a plurality of parameters in a manner most suited to each of these typical sooting conditions by utilizing the above-stated features of control parameters. The system control circuit 19 is arranged to have a plurality of control modes in which shooting can be automatically controlled on the basis of the above-stated control functions. The plurality of control modes are arranged to be selectable either according to the shooting conditions or to the intention of the camera operator. In accordance with the selection of one of the control modes, the system control circuit 19 computes a correction value for the iris, the electronic shutter or the AGC and supplies a control signal to each applicable control part.

In the program shooting mode, the state of the iris in some case may become different from a state obtained for the same object by the conventional AE control method. The ordinary charge storage time of the image sensor is, for example, 1/60 sec (hereinafter, this charge storage time is called a normal shooting state). In the case of a shooting mode, in which the charge storage time is set at 1/250 sec by the function of the electronic shutter, the charge storage time becomes shorter. In this case, in order to have a video signal which is a final output at an adequate level, the position of the iris must be set at a position closer to a maximum aperture position then a position set in the normal shooting state by as much as the difference between the two different values of charge storage time.

Figure 3:
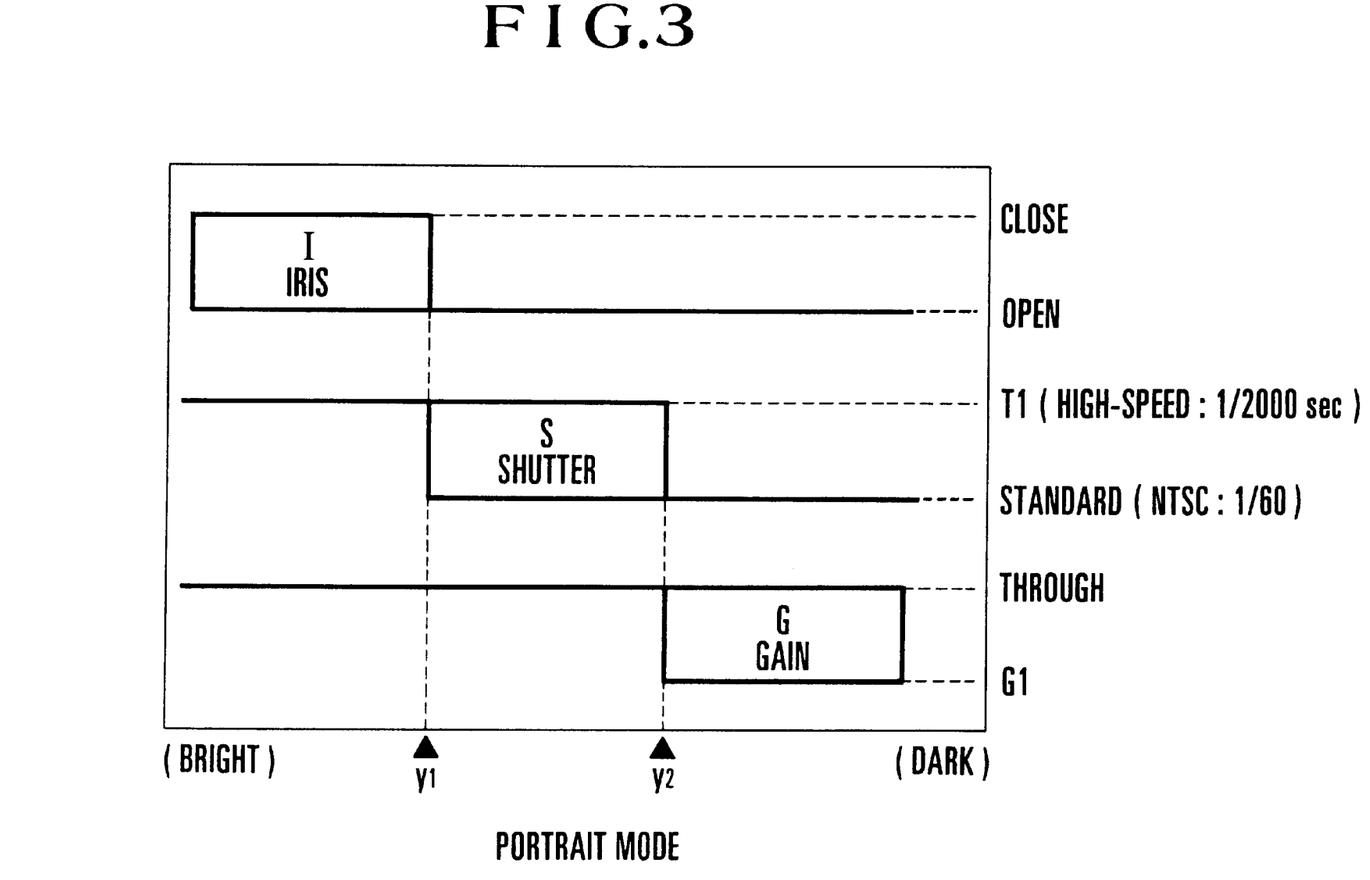
FIG. 3 is a program chart for a portrait mode.
Figure 4:
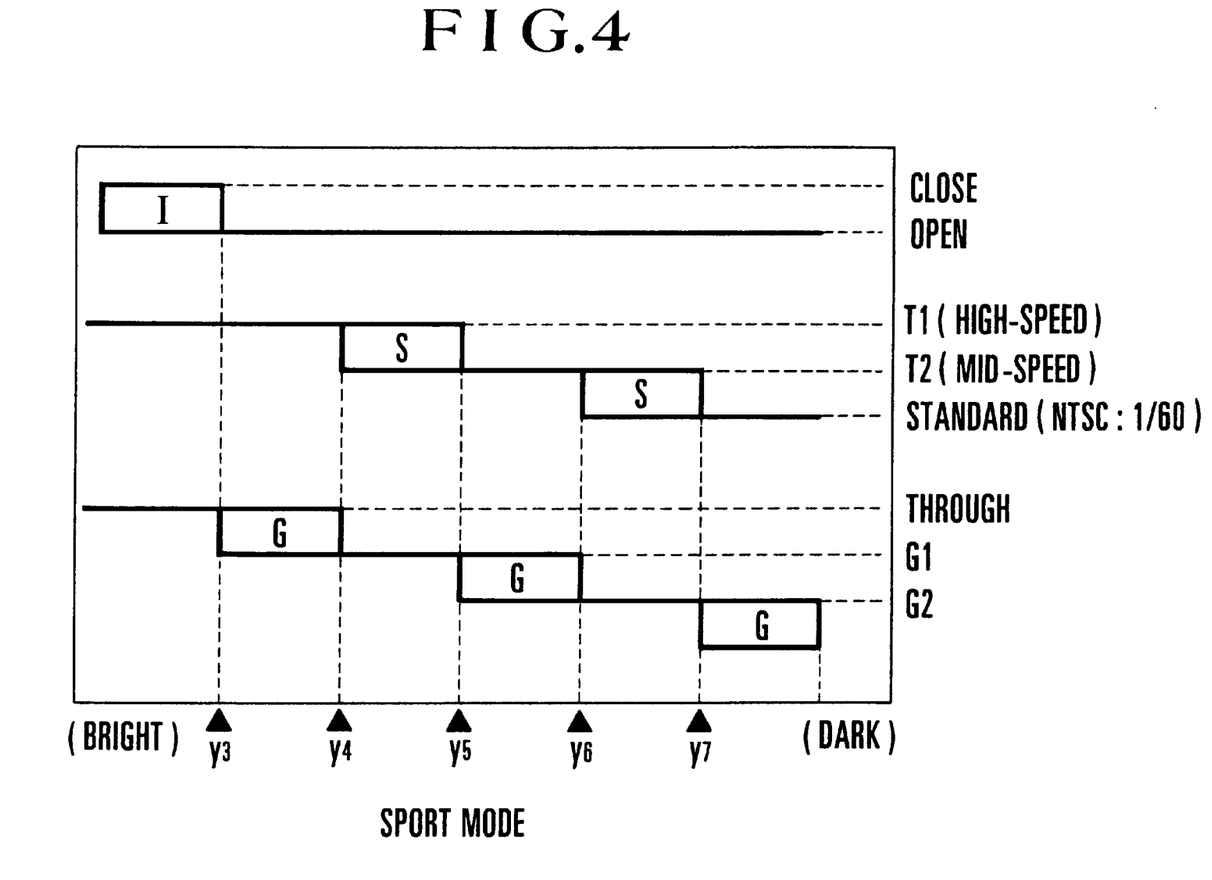
FIG. 4 is a program chart for a sport mode.
Figure 5:
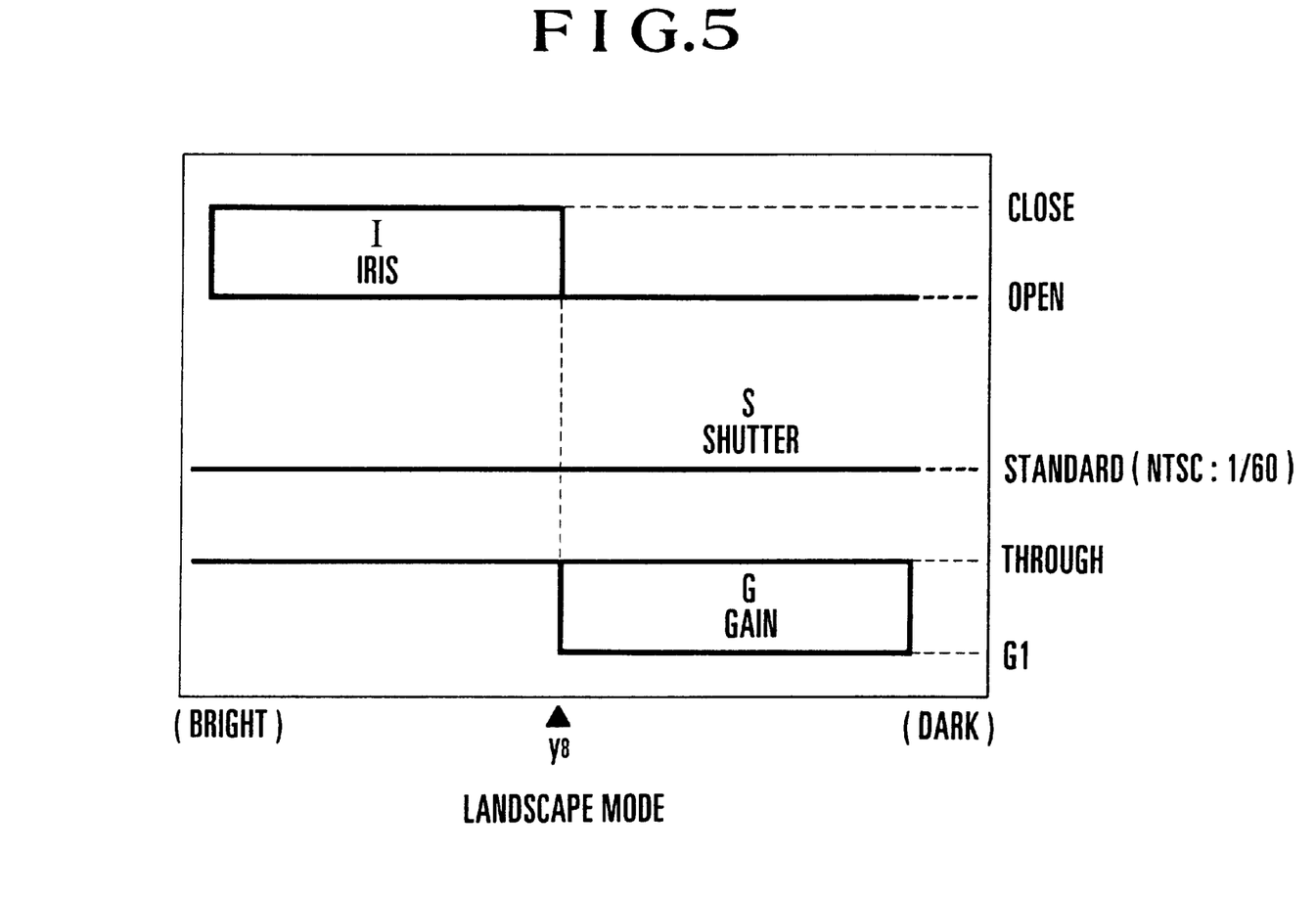
FIG. 5 is a program chart for a landscape mode.

The following describes the examples of special shooting modes, i.e., the program modes, in which the parameters for the iris, the shutter and the gain are set differently from the normal shooting mode:

FIGS. 3, 4 and 5 are so-called program diagrams showing the states of setting exposure control parameters respectively in the program modes for different presumed shooting conditions. FIG. 3 shows a portrait mode which is arranged by setting exposure control parameters suitable for portrait shooting. FIG. 4 shows a sport mode which is arranged by setting exposure control parameters suitable for shooting an object moving at a high speed like in the case of a sport. FIG. 5 shows a landscape mode which is arranged by setting exposure control parameters suitable for shooting a landscape or scenery.

Referring to FIG. 3 which shows the portrait mode, the brightness or input luminance levels are shown on the abscissa axis. The setting values of the exposure parameters are shown on the ordinate axis. The abscissa axis is divided into three areas by threshold values y1 and y2 according to the brightness. The exposure parameters are set for each of these areas.

In FIG. 3, reference symbol I denotes a movable or variable range of the iris, symbol S that of the electronic shutter, and symbol G that of the gain. The illustration shows that within each variable range, the value of each parameter varies either continuously or stepwise. In other words, in an area brighter than the threshold value y1, it is only the iris th at changes accordingly as the brightness changes, whereas the electronic shutter is fixed at a predetermined speed value of 1/2000 sec which is higher than the period 1/60 sec of the TV signal and the gain is set at "THROUGH" which means zero dB. In an area between the threshold values y1 and y2, the iris is at a full open position "OPEN" and the gain at zero dB "THROUGH" while the electronic shutter alone changes its speed according to the brightness between the speed 1/2000 sec and a standard speed 1/60 sec for a standard TV signal conforming to the NTSC system.

Further, for a case where the object is dark and its brightness (or luminance) is less than the threshold value y2, the iris is at the full open position "OPEN" and the electronic shutter is fixed at the speed of 1/60 sec which is the speed for a standard TV signal, while the gain alone is variable from the zero dB to a predetermined value G1 according to the brightness of the object.

In other words, in the portrait mode, the object is assumed to be a person or the like. The program is set on the following conditions: The depth of field is set to be shallow for the purpose of emphasizing a main object in contrast with the background of it. The degradation of resolution due to a diffraction phenomenon which takes place at a stopped-down aperture as mentioned in the foregoing must be prevented. The gain is fixed at zero dB for improvement in the S/N ratio. In view of these conditions, the iris is set at a full open position and the speed of the electronic shutter is increased to obtain an apposite exposure when the input luminance level is less than the threshold value y1. The iris is set to be operated only within a very high luminance area where the luminance level is higher than the threshold value y1.

In the case of the program chart for the sport mode shown in FIG. 4, the input luminance levels on the axis of abscissa are divided into six areas by five threshold values y3 to y7. In order to appositely take a picture of fast moving objects, the shutter speed is set at high speeds as a whole. More specifically, the shutter speed is set at three speeds including a high speed T1, a medium speed T2 and the standard speed of 1/60 sec. In each of areas between the threshold values, the gain is controlled by three steps including 0 dB, G1 and G2. The reason for setting the parameters in the manner described is not directly related to this invention and, therefore, the details of it are omitted from description.

Further, the example of the landscape mode shown in FIG. 5 is described as follows: In this case, the input luminance levels are divided into two areas by a threshold value y8. In the area where the luminance level of the object is higher than the threshold level y8, an exposure is controlled by the iris. In the area where the luminance level of the object is lower than the threshold value y8, the exposure is controlled by the gain. The speed of the electronic shutter remains at the standard speed of 1/60 sec for all the luminance levels. This is because the objects are stationary requiring no complex parameter setting in general in the case of landscapes.

Many other shooting modes are conceivable beside the above-stated shooting modes. The conceivable other modes include, for example, a mode of indoor shooting (with illumination by fluorescent lamps, in particular), a mode of shooting an object having a spot light at one point, etc.

However, what is in question in the case of this invention is not the shooting modes themselves but is the problem related to change-over from one mode to another. When one shooting mode is changed over to another, even if a shooting object remains the same and unchanged, the aperture value might be caused to change for exposure correction by a change in the variable range of the iris or in that of the shutter speed because of differences among different shooting modes in respect of the variable range of the iris and that of the shutter speed.

Assuming that change-over is made among the three shooting modes shown in FIGS. 3, 4 and 5, since the movable or variable range of the iris in one mode differs from that of the iris in another, the position of the iris varies from its full open position to a position close to its smallest stopped-down position, in an extreme case, even while the object remains unchanged.

As mentioned in the foregoing, this change greatly affects the focus control and the white balance control. In the focus control, the speed of the focus lens comes to change due to a change in the depth of field. The change in speed changes its ability to follow up the object. As for the white balance control, a sudden change in the aperture value is mistaken for a great change in the object and thus results in an erroneous restart of control which makes images unstable.

To solve this problem, the embodiment of this invention is arranged to have the detection signal of the iris encoder element 4 which is arranged to detect the aperture value of the iris taken in by the data correction part 19g. Then, the amount of change in the state of the iris caused by the differences in shutter speed and in movable or variable range of the iris instead of a change in the object is computed by making reference to electronic shutter speed information data set by the exposure control part 19b. This amount of change is offset by correcting and adjusting, according to the amount of change, the value of the iris position detection signal back to the value obtained before the change. The corrected signal is then supplied to the white balance control part 19a and the focus control part 19c.

Further, in cases where the aperture value happens to change due to a change-over of the shooting mode instead of a change in the object under a normal shooting condition according to the luminance of the object and the shooting mode, the arrangement of correcting the aperture value to the value obtained before the change of the iris and supplying the corrected value to the white balance and focus control parts which operate on the basis of the state of the iris effectively prevents such a change in the aperture value from being mistaken for a change caused by an actual change in the object. The arrangement thus enables the embodiment to accurately carry out control by using information on the aperture value in a manner apposite to the ambient shooting conditions, without any erroneous restart of white balance control or any decrease in the object follow-up ability of the focus control due to a change in the focus control speed as a result of mistaking the change for a change in the object.

The data correction part 19g not only corrects the adverse effect of change-over of the shooting mode but also makes necessary corrections for all other factors that affect the state of the iris mechanism. The corrected signal for the state of the iris mechanism is usable not only for the white balance control and the focus control but also for other purposes.

As described above, the embodiment of this invention is provided with the correction means which is arranged to operate, even in a special shooting control method of using such parameters that affect the state of the iris mechanism, to correct the detection signal for the state of the iris mechanism into a value corresponding to a value obtainable in a normal shooting mode. The corrected detection signal indicating the state of the iris mechanism is then used for the white balance control and the focus control, so that the operation of each of the control systems can be optimized for a higher rate of performance.

What is claimed is:

1. An image pickup apparatus comprising:
   (a) image sensor;
   (b) iris control means for automatically controlling an iris in accordance with a brightness of an object and a predetermined exposure program;
   (c) detection means for detecting whether the iris varies to cancel a brightness variation of an object or said iris varies corresponding to an exposure program change irrelevant of a brightness variation of an object; and
   (d) focus control means for changing a focus condition of an image impinged on said image sensor when said detection means detects that said iris varies to cancel a brightness variation of an object and for inhibiting changing the focus condition when said detection means detects that iris varies corresponding to said exposure program change irrelevant with a brightness variation of an object.

2. An image pickup apparatus according to claim 1, further comprising memory for storing a previous focus condition when said iris varies corresponding to the mode change irrelevant with the brightness variation of the object.

3. An image pickup apparatus according to claim 1, wherein said focus control means control the focus condition also in response to the output of said image sensor.

4. An image pickup apparatus according to claim 1, further comprising:
   white balance control means for changing a white balance of an output of said image sensor when said detection means detects that said iris varies to cancel a brightness variation of an object and for inhibiting changing the white balance when said detection means detects that iris varies corresponding to said exposure program change irrelevant of a brightness variation of an object.

5. An image pickup apparatus according to claim 4, further comprising memory for storing a previous white balance condition when said iris varies corresponding to the mode change irrelevant with the brightness variation of the object.

6. An image pickup apparatus according to claim 4, wherein said white balance control means control the white balance also in response to the output of said image sensor.

* * * * *

UNITED STATES PATENT AND TRADEMARK OFFICE
CERTIFICATE OF CORRECTION

PATENT NO.   : 5,999,215
DATED        : December 7, 1999
INVENTOR(S)  : Kyoji Tamura Page 1 of 1

It is certified that error appears in the above-identified patent and that said Letters Patent is hereby corrected as shown below:

Title page,
Item [54], after "APPARATUS" insert -- WITH FOCUS STATE AND/OR WHITE BALANCE STATE MAINTAINING MEANS --.

Column 6,
Line 7, "th at" and insert -- that --.

Signed and Sealed this

Nineteenth Day of February, 2002

Attest:

JAMES E. ROGAN
Attesting Officer    Director of the United States Patent and Trademark Office